US011843837B2

(12) United States Patent
Montgomery et al.

(10) Patent No.: US 11,843,837 B2
(45) Date of Patent: Dec. 12, 2023

(54) GROUP TELEVISED CONTENT VIEWING INTERACTIONS

(71) Applicant: DISH Network L.L.C., Englewood, CO (US)

(72) Inventors: Jesse Montgomery, Denver, CO (US); Timothy Meyer, Denver, CO (US); Matthew Polson, Castle Rock, CO (US); Robert Sadler, Denver, CO (US); Christopher Kuhrt, Englewood, CO (US); Shaun Ryan, Colorado Springs, CO (US); James Wilde, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 17/327,145

(22) Filed: May 21, 2021

(65) Prior Publication Data

US 2022/0377427 A1 Nov. 24, 2022

(51) Int. Cl.
| | |
|---|---|
| H04N 21/4788 | (2011.01) |
| H04N 21/45 | (2011.01) |
| G06Q 50/34 | (2012.01) |
| H04N 21/258 | (2011.01) |
| H04N 21/858 | (2011.01) |
| H04N 21/2187 | (2011.01) |

(52) U.S. Cl.
CPC ......... *H04N 21/4788* (2013.01); *G06Q 50/34* (2013.01); *H04N 21/2187* (2013.01); *H04N 21/25891* (2013.01); *H04N 21/4532* (2013.01); *H04N 21/858* (2013.01)

(58) Field of Classification Search
CPC .......... H04N 21/4788; H04N 21/2187; H04N 21/25891; H04N 21/4532; H04N 21/858; G06Q 50/34
See application file for complete search history.

(56) References Cited

U.S. PATENT DOCUMENTS

| | | | |
|---|---|---|---|
| 8,282,468 B2 | 10/2012 | Huntley et al. | |
| 9,288,539 B2 | 3/2016 | Johnson | |
| 9,854,317 B1* | 12/2017 | Abboa-Offei | .... H04N 21/25875 |
| 2001/0037211 A1 | 11/2001 | McNutt et al. | |
| 2008/0064490 A1 | 3/2008 | Ellis | |
| 2008/0066111 A1* | 3/2008 | Ellis | .......... H04N 5/50 725/57 |
| 2011/0287825 A1* | 11/2011 | Hoover | ............... G07F 17/3225 463/20 |
| 2012/0231890 A1* | 9/2012 | Junkin | .................... A63F 13/46 463/42 |

(Continued)

*Primary Examiner* — Michael R Telan

(74) *Attorney, Agent, or Firm* — KILPATRICK TOWNSEND & STOCKTON, LLP

(57) ABSTRACT

Various arrangements for group-based content viewing are presented herein. A television service provider system may receive wager data corresponding to a live content event for multiple user accounts that are grouped together. A viewing group for the live content event may be created for the grouped user accounts. Wager data corresponding to the user accounts may be transmitted to content viewing devices for the multiple user accounts. The live content event can be output for presentation concurrently with presentation of an indication of the at least one wager on the live content event linked to each user account.

19 Claims, 7 Drawing Sheets

(56) References Cited

U.S. PATENT DOCUMENTS

| | | | |
|---|---|---|---|
| 2013/0203483 A1* | 8/2013 | Joshi | G06Q 20/384 |
| | | | 463/25 |
| 2015/0379816 A1* | 12/2015 | Hayon | G07F 17/32 |
| | | | 463/25 |
| 2017/0103615 A1* | 4/2017 | Theodosopoulos | |
| | | | G07F 17/3288 |
| 2018/0304146 A1* | 10/2018 | Dayal | G07F 17/38 |
| 2019/0158787 A1* | 5/2019 | Pino, Jr. | H04N 21/2543 |
| 2019/0238909 A1 | 8/2019 | Graham et al. | |
| 2020/0074181 A1* | 3/2020 | Chang | A63F 13/65 |
| 2020/0357246 A1* | 11/2020 | Nelson | G07F 17/3251 |
| 2021/0056750 A1* | 2/2021 | Rowley | G06T 19/20 |
| 2021/0076099 A1* | 3/2021 | Ganschow | G06F 3/04817 |
| 2021/0118264 A1 | 4/2021 | Nelson et al. | |
| 2021/0168457 A1 | 6/2021 | Taylor | |
| 2021/0344991 A1 | 11/2021 | Todd | |
| 2022/0103905 A1 | 3/2022 | Montgomery et al. | |
| 2022/0377427 A1 | 11/2022 | Montgomery et al. | |

\* cited by examiner

GROUP TELEVISED CONTENT VIEWING INTERACTIONS

BACKGROUND

As people spend more time in their homes, they crave ways of interacting with their friends or like-minded individuals. While historically people have frequented public spaces, such as restaurants and bars, to view televised live events, such as sporting events, more people are tending to view such events from home. Viewing live events from home broadcast by a television service provider tends to remove the excitement of interaction with others. Embodiments detailed herein provide technical arrangements that allow a user to engage with fellow members of the "crowd," despite viewing the content through a television service provider.

SUMMARY

Various embodiments are described related to a method for group-based content viewing. In some embodiments, a method for group-based content viewing is described. The method may comprise receiving, by a television service provider system, wager data corresponding to a live content event for a plurality of user accounts. Each user account of the plurality of user accounts may be linked to at least one wager on the live content event. The method may comprise determining, by the television service provider system, the plurality of user accounts are grouped. The method may comprise creating, by the television service provider system, a viewing group for the live content event for the plurality of user accounts based on determining the plurality of user accounts are grouped. The method may comprise transmitting, by the television service provider system, to a plurality of content output devices, the wager data corresponding to the plurality of user accounts. Each of the plurality of content output devices may be mapped to a particular user account of the plurality of user accounts. The method may comprise outputting, by each content output device of the plurality of content output devices, the live content event for presentation concurrently with presentation of an indication of the at least one wager on the live content event linked to each user account of the plurality of user accounts.

Embodiments of such a method may include one or more of the following features: determining the plurality of user accounts are linked may be partially based on receiving, by the television service provider system, a request to link a first user account of the plurality of user accounts to a second user account of the plurality of user accounts. The method may comprise receiving, by the television service provider system, text from a content output device of the plurality of content output devices. The method may comprise transmitting, by the television service provider system, the text for presentation to other content output devices of the plurality of content output devices. The method may further comprise transmitting, by the television service provider system to the plurality of content output devices, a ranking of each user account of the plurality of user accounts based on the at least one wager on the live content event placed by each user account. The method may further comprise outputting, by each content output device of the plurality of content output devices, for presentation the ranking of each user account of the plurality of user accounts based on the at least one wager on the live content event placed by each user account. The method may further comprise during the live content event, adjusting, by the television service provider system, the ranking based on one or more in-event occurrences of the live content event. Determining the plurality of user accounts are linked may be based on a team selected by each user account of the plurality of user accounts for the at least one wager. The method may further comprise during the live content event, receiving, by the television service provider system, an indication of an additional wager placed by a user account of the plurality of user accounts on the live content event. The method may further comprise outputting, by each content output device of the plurality of content output devices, for presentation the additional wager. The method may further comprise during the live content event, receiving, by the television service provider system, an indication of a wager between only a first user account of the plurality of user accounts and a second user account of the plurality of user accounts. The first user account and the second user account may be on opposite sides of the wager. The method may further comprise concurrently with outputting the live content event, outputting, by each content output device of the plurality of content output devices, a video chat interface for video and audio communication between the plurality of content output devices. The method may further comprise concurrently with outputting the live content event, outputting, by each content output device of the plurality of content output devices, a text-based group chat interface for communication between the plurality of content output devices. Determining the plurality of user accounts are linked may be based on each user account of the plurality of user accounts wagering an amount within a predefined value range.

In some embodiments, a group-based content viewing television system is described. The system may comprise a plurality of content output devices. The system may comprise a television service provider system that transmits televised content to the plurality of content output devices and communicates with an electronic sportsbook provider system. The television service provider system may be configured to receive wager data corresponding to a live content event for a plurality of user accounts. Each user account of the plurality of user accounts may be linked to at least one wager on the live content event. The television service provider system may be configured to determine the plurality of user accounts are grouped. The television service provider system may be configured to create a viewing group for the live content event for the plurality of user accounts based on determining the plurality of user accounts are grouped. The television service provider system may be configured to transmit, to the plurality of content output devices, the wager data corresponding to the plurality of user accounts. Each of the plurality of content output devices may be mapped to a particular user account of the plurality of user accounts. Each content output device of the plurality of content output devices output the live content event for presentation concurrently with presentation of an indication of the at least one wager on the live content event linked to each user account of the plurality of user accounts.

Embodiments of such a method may include one or more of the following features: the television service provider system may be further configured to determine the plurality of user accounts are linked based on receiving a request to link a first user account of the plurality of user accounts to a second user account of the plurality of user accounts. The television service provider system may be further configured to receive text from a content output device of the plurality of content output devices. The television service provider system may be further configured to transmit the text for presentation to other content output devices of the plurality of content output devices. The television service provider system may be further configured to transmit, to the plurality of content output devices, a ranking of each user account of the plurality of user accounts based on the at least one wager on the live content event placed by each user account. Each content output device of the plurality of content output devices may be further configured to output for presentation the ranking of each user account of the plurality of user accounts based on the at least one wager on the live content event placed by each user account. The television service provider system may be further configured to adjust the ranking based on one or more in-event occurrences of the live content event during the live content event. The television service provider system may be further configured to determine the plurality of user accounts are linked may be based on a team selected by each user account of the plurality of user accounts for the at least one wager. The television service provider system may be further configured to receive an indication of an additional wager placed by a user account of the plurality of user accounts on the live content event during the live content event. Each content output device of the plurality of content output devices may output for presentation the additional wager. Each content output device of the plurality of content output devices may be selected from the group consisting of: a television receiver; a computerized device that executes a first streaming application; a smart television; and a streaming device that executes a second streaming application. The system may further comprise the electronic sportsbook provider system.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Live events, such as live sporting events, can be viewed on broadcast television or a content streaming service via a television service provider. For entertainment or other purposes, a viewer may place a wager on the outcome of the live event. Such a wager may be placed through a sportsbook provider system that is distinct from the television service provider system. Data may be exchanged between the sportsbook provider system and the television service provider system to provide an enhanced viewing and wagering experience.

A live event viewing group can allow grouped users to view the same live event through the television service provider while viewing information about other users in group, including other users' wager information placed through the sportsbook provider system. An interface presented may provide a dynamic ranking of the group's users based on the users' wager information on the live event being presented.

Wager information can be retrieved or otherwise received from the sportsbook system and presented to users in a group. A communication interface may permit text, voice, and/or video to be shared among the users of the defined group distinct from the sportsbook system. Therefore, the users may be permitted to view each other's wagers, view a user ranking based on wagers, communicate, and view the live event concurrently.

The specific groups of users can be defined by the sportsbook system, by the television service provider system, or by a combination of the two. A particular user may define a listing of contacts with the sportsbook provider and/or television service provider. In order to be placed into a group with a particular other user, multiple factors may be required to be met, such as: having both place a wager on a particular live event; and having both list each other as a contact. Other embodiments detailed herein can create groups of users using other factors.

Figure 1:
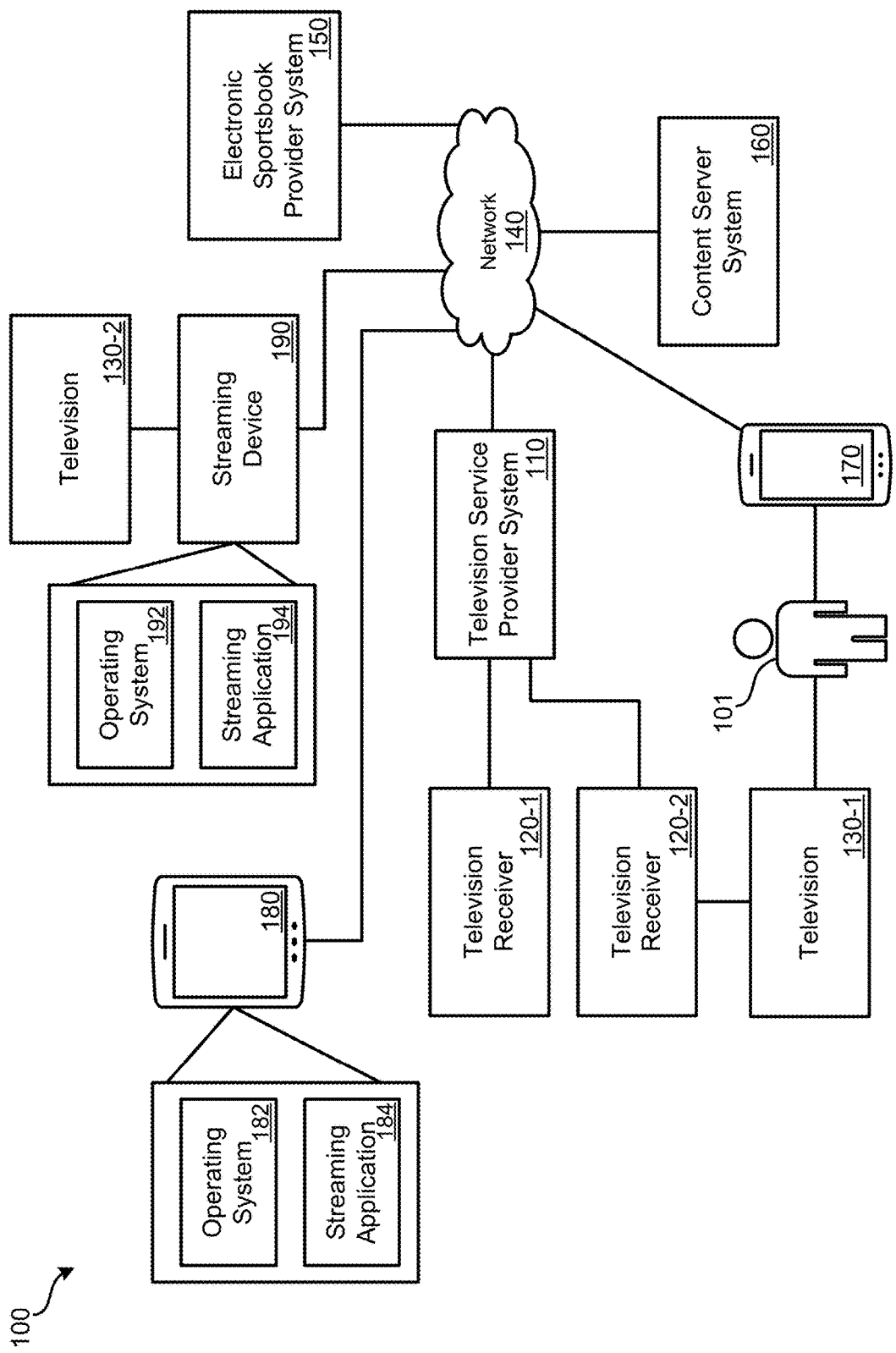
FIG. 1 illustrates an embodiment of a system for content viewing and group interactions.

FIG. 1 illustrates an embodiment of a system for content viewing and group interactions system 100 ("system 100"). System 100 can include: television service provider system 110; television receivers 120 (120-1, 120-2); televisions 130 (130-1, 130-2); network 140; electronic sportsbook provider system 150 ("sportsbook system 150"); content server system 160; mobile device 170; computerized device 180; and streaming device 190. Person 101 can also be referred to as a "television viewer" or "user."

Television service provider system 110 may broadcast live television programming to television receivers 120 and/or transmit live television programming as a streaming service via the Internet to computerized devices and streaming devices. "Live" television programming refers to television programming that is transmitted substantially contemporaneously with the event occurring. Live television programming may include a delay of up to several minutes. For instance, a sporting event that is broadcast with a delay of up to a few minutes, such as to edit out offensive audio, qualifies as live television programming. Such live television programming may be received from various content providers, then relayed by television service provider system 110 to television receivers 120 via a television distribution network and/or as an over-the-top (OTT) service to computerized and/or streaming devices via the Internet (or some other public network). Streams of many television channels may be broadcast live via various types of television programming distribution networks, such as a satellite-based network, a cable-based network, an IP-based network, or an OTT television distribution network. In addition to streaming live television channels, television service provider system 110 may transmit on-demand content, applications for execution, electronic programming guide (EPG) data, metadata, and other services ancillary to live television programming. Further detail regarding a possible embodiment of television service provider system 110 is provided in relation to FIG. 2.

While two television receivers 120 are presented, this number of television receivers is merely for illustration—many more television receivers may receive live television programming from television service provider system 110 in other embodiments. A television receiver, such as television receiver 120-2, may be integrated as part of a television or other form of display device or may be a separate device, such as a set top box (STB), that receives data from television service provider system 110 and outputs the data for presentation, such as to television 130-1. The data received by a television receiver may be scrambled or encrypted and the television receiver may only have authorization to decode/descramble particular television channels and/or particular groups of television channels based on a rights scheme assigned to the user account mapped to the television receiver.

Additionally or alternatively, some other form of device that is capable of outputting television programming for presentation may be used instead of television receivers 120. For instance, television programming, such as a live sporting event, may be distributed over network 140 (e.g., including the Internet). Computerized device 180, such as a smartphone, gaming device, or tablet computer may be used to view the television programming. The same computerized device may be used to interact with sportsbook system 150. Computerized device 180 may execute operating system 182. A user may install streaming application 184 on computerized device 180, which permits the user to use a user account to access television service provider system 110 via network 140. The user may be permitted to view any television channel via computerized device 180 for which the user account is presently authorized, such as due to a subscription or other grant of rights.

Streaming device 190 can represent a computerized device that does not directly output video. For instance, streaming device 190 may be plugged into a port of television 130-2, which can be used to output video and/or audio. Similar to computerized device 180, streaming device 190 can execute operating system 192 using one or more processors. Streaming application 194 may be installed on streaming device 190, which can allow television programming streams output by television service provider system 110 to be presented on television 130-2.

Television service provider system 110 may use a dedicated television-distribution network to communicate with television receivers 120. Additionally or alternatively, network 140 may be used to communicate with television receivers 120 and/or sportsbook system 150, and content server system 160. Network 140 may include one or more public and/or private networks, which can include the Internet.

Sportsbook system 150 may be operated by an entity that is distinct from the entity operating television service provider system 110. Sportsbook system 150 may host various wagers and may be used to set the odds on such wagers. A person located in a jurisdiction that permits sports gaming and is of legal age may be permitted to place a wager via sportsbook system 150. A person may be able to access sportsbook system 150 using a computerized device, such as mobile device 170. Mobile device 170 may allow television viewer 101 to access sportsbook system 150 via an application installed on mobile device 170 or by using a web browser on mobile device 170 to access the website of sportsbook system 150. Mobile device 170 may be a smart phone, gaming device, tablet computer, laptop computer, cellular phone, desktop computer, personal digital assistant, or some other form of computerized device.

Television service provider system 110 may communicate with sportsbook system 150 via network 140. Sportsbook system 150 may provide an indication of various wagers and the associated odds with such wagers to television service provider system 110. Television service provider system 110 may relay such betting information to television receivers 120. Sportsbook system 150 may also transmit indications of wagers placed by particular television viewers to television service provider system 110. Television service provider system 110 may relay wagers placed by a particular television viewer to the television viewer's television receiver for presentation. Sportsbook system 150 may query television service provider system 110 to determine whether a user has access to a particular television channel or for a listing of all television channels to which the user has access. Alternatively, an indication of a wager may be sent to television service provider system 110 by sportsbook system 150. Television service provider system 110 may determine a content event associated with the wager and determine whether a user has access. An indication of whether the user has access to the content event on a television channel may be provided back to sportsbook system 150.

Content server system 160 may provide content information to television service provider system 110 and sportsbook system 150. For example, content server system 160 may provide details on the sporting event, such as the television channel, the date, the scheduled start time and scheduled end time of the sporting event on the television channel, details of the teams and players participating in the sporting event (e.g., team records, player-specific statistics), the location of the sporting event, and/or other details of the sporting event. Such data may be used by television service provider system 110 to populate an electronic programming guide (EPG).

Television viewer 101 may be using television 130 to view the sporting event. The sporting event may be received as live television programming by television receiver 120-2 from television service provider system 110. Television viewer 101 may use a remote control to interact with television receiver 120-2. Television viewer 101 has an option to view a sports gaming interface. In some embodiments, some other form of electronic device may be used, such as a computerized mobile device or smartphone. This sports gaming interface can be output concurrently with television programming, such as the live sporting event being viewed by television viewer 101. The sports gaming interface may function as an application that is installed on television receiver 120-2. Television service provider system 110 may have previously transmitted data to all of television receivers 120 or in response to a request for a particular television receiver initiated by a user, such as television viewer 101. A similar interface may be presented via streaming applications 84 and 194.

Television viewer 101 may also be using mobile device 170. Television viewer 101 may, via the sports gaming interface output by television receiver 120-2, trigger one or more staged wagers to be transmitted to mobile device 170. In such embodiments, the sports gaming interface executed by television receiver 120-2 may transmit a pre-staged wager, which can include an indication of the one or more wagers (a wage identifier) and an account identifier to television service provider system 110. Television service provider system 110 relays this information to sportsbook system 150 via network 140. Alternatively, the sports gaming interface may use an application programming interface (API) to relay an indication of the one or more wagers to the sportsbook system 150 (without communicating through television service provider system 110). Sportsbook system 150 may then be triggered to transmit a link or notification to mobile device 170. In some embodiments, a pop-up notification is presented on mobile device 170 that can be selected by television viewer 101. Selection of such notification may cause a website or application executed by mobile device 170 to launch that will include the pre-staged wagers set up by television viewer 101 via the sports gaming interface output by television receiver 120-2. In other embodiments, a link may be sent, such as via text message or email, to mobile device 170. Again here, watching the link may cause a website or application executed by mobile device 170 to launch that will include the pre-staged wagers set up by television viewer 101 of the sports gaming interface output by television receiver 20-2. Television viewer 101 may then edit, fund, and/or otherwise complete the pre-staged wagers set up via the sports gaming interface. Similarly, television viewer 101 may interact with mobile device 170 to complete a bet similarly when viewing television channels via computerized device 180 and/or streaming device 190.

In some embodiments, television receiver 120-2 can communicate with mobile device 170. After television viewer 101 has pre-staged one or more wagers using the sports gaming interface output by television receiver 120-2, television viewer 101 can trigger presentation of a machine-readable code, such as a barcode or QR (Quick Response) code, to be output by television receiver 120-2 and presented via television 130. The machine-readable code may be read by mobile device 170 using an application for reading machine-readable codes or functionality integrated into a sports gaming application associated with sportsbook system 150. The machine-readable code may have identifiers of the staged wagers embedded. These identifiers may be used by sportsbook system 150 to cause mobile device 170 to present the staged wagers and allow television viewer 101 to edit, fund, and/or otherwise complete the pre-staged wagers.

Alternatively, an indication of such bets and an associated identifier may be transmitted by television receiver 120-2 to television service provider system 110, which may relay the information to sportsbook system 150. The associated identifier may be embedded in the machine-readable code and may be acquired by mobile device 170 by imaging the machine-readable code. The associated identifier may then be transmitted by mobile device 170 to sportsbook system 150 to retrieve the staged wagers that are mapped to the identifier.

To communicate with other users in a group, such as via text, video, and/or audio, separate devices may be used for communication and content viewing. A television receiver 120-1, computerized device 180, or streaming device 190 may be used to view the live event. Communication between users in a group may occur via an application executed on mobile device 170. Such an arrangement can allow for a larger portion of a display screen to be devoted to viewing of the live event.

Figure 2:
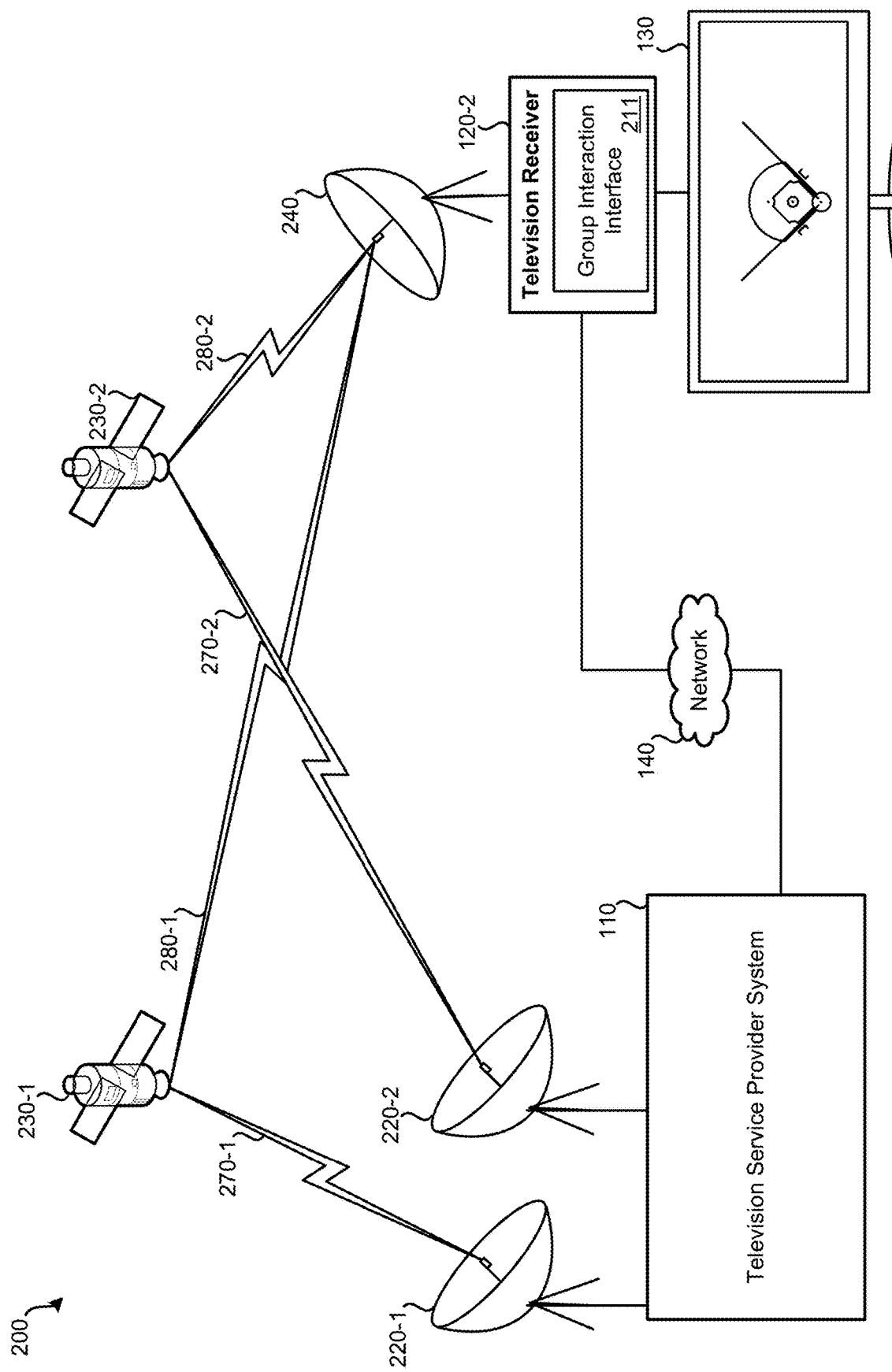
FIG. 2 illustrates an embodiment of a television distribution system.

FIG. 2 illustrates an embodiment of a satellite-based television distribution system 200. Satellite-based television distribution system 200 may include: television service provider system 110, satellite transmitter equipment 220, satellites 230, satellite antenna 240, television receiver 120-2, and television 130. Alternate embodiments of satellite-based television distribution system 200 may include fewer or greater numbers of components. While only one satellite antenna 240, television receiver 120-2, and television 130 (which can collectively be referred to as "user equipment") are illustrated, it should be understood that multiple (e.g., tens, thousands, millions) instances of user equipment may receive television signals from television service provider system 110 via satellites 230. In the example of FIG. 2, while television service provider system 110 uses satellites to communicate with television receiver 120-2, other forms of television programming distribution networks can be used in other embodiments.

Television service provider system 110 and satellite transmitter equipment 220 may be operated by a television service provider. A television service provider may distribute television channels that distribute live television programming, on-demand programming, pay-per-view (PPV) programming, programming information, data, firmware updates, and/or other content/services to users. Television service provider system 110 may receive feeds of one or more live television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 220 (120-1, 220-2) may be used to transmit a feed of one or more television channels from television service provider system 110 to one or more satellites 230. While a single television service provider system 110 and satellite transmitter equipment 220 are illustrated as part of satellite-based television distribution system 200, it should be understood that multiple instances of transmitter equipment may be used, possibly scattered geographically, to communicate with satellites 230. Such multiple instances of satellite transmitting equipment may communicate with the same or with different satellites. Different television channels may be transmitted to satellites 230 from different instances of transmitting equipment. For instance, a different satellite antenna of satellite transmitter equipment 220 may be used for communication with satellites in different orbital slots.

Satellites 230 may be configured to receive signals, such as streams of television channels, from one or more satellite uplinks such as satellite transmitter equipment 220. Satellites 230 may relay received signals from satellite transmitter equipment 220 (and/or other satellite transmitter equipment) to multiple instances of user equipment via transponder streams. Different frequencies may be used for uplink signals 270 from transponder streams 280. Satellites 230 may be in geosynchronous orbit. Each of the transponder streams transmitted by satellites 230 may contain multiple television channels transmitted as packetized data. For example, a single transponder stream may be a serial digital packet stream containing multiple television channels. Therefore, packets for multiple television channels may be interspersed.

Multiple satellites 230 may be used to relay television channels from television service provider system 110 to satellite antenna 240. Different television channels may be carried using different satellites. Different television channels may also be carried using different transponders of the same satellite; thus, such television channels may be transmitted at different frequencies and/or different frequency ranges. As an example, a first and second television channel may be relayed via a first transponder of satellite 230-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite antenna 240 may be a piece of user equipment that is used to receive transponder streams from one or more satellites, such as satellites 230. Satellite antenna 240 may be provided to a subscriber for use on a subscription basis to receive television channels provided by the television service provider system 110, satellite transmitter equipment 220, and/or satellites 230. Satellite antenna 240, which may include one or more low noise blocks (LNBs), may be configured to receive transponder streams from multiple satellites and/or multiple transponders of the same satellite. Satellite antenna 240 may be configured to receive television channels via transponder streams on multiple frequencies. Based on the characteristics of television receiver 120-2 and/or satellite antenna 240, it may only be possible to capture transponder streams from a limited number of transponders concurrently. For example, a tuner of television receiver 120-2 may only be able to tune to a single transponder stream from a transponder of a single satellite at a given time. The tuner can then be re-tuned to another transponder of the same or a different satellite. A television receiver 120-2 having multiple tuners may allow for multiple transponder streams to be received at the same time.

In communication with satellite antenna 240 may be one or more television receivers. Television receivers may be configured to decode signals received from satellites 230 via satellite antenna 240 for output and presentation via a display device, such as television 130. A television receiver may be incorporated as part of a television or may be part of a separate device, commonly referred to as a set-top box (STB). Television receiver 120-2 may decode signals received via satellite antenna 240 and provide an output to television 130. FIG. 2 provides additional detail of various embodiments of a television receiver. A television receiver is defined to include set-top boxes (STBs) and also circuitry having similar functionality that may be incorporated with another device. For instance, circuitry similar to that of a television receiver may be incorporated as part of a television. As such, while FIG. 2 illustrates an embodiment of television receiver 120-2 as separate from television 130, it should be understood that, in other embodiments, similar functions may be performed by a television receiver integrated with television 130.

Television 130 may be used to present video and/or audio decoded and output by television receiver 120-2. Television receiver 120-2 may also output a display of one or more interfaces to television 130, such as an electronic programming guide (EPG). In many embodiments, television 130 is a television. Television 130 may also be a monitor, computer, or some other device configured to display video and, possibly, play audio.

Uplink signal 270-1 represents a signal between satellite transmitter equipment 220 and satellite 230-1. Uplink signal 270-2 represents a signal between satellite transmitter equipment 220 and satellite 230-2. Each of uplink signals 270 may contain streams of one or more different television channels. For example, uplink signal 270-1 may contain a first group of television channels, while uplink signal 270-2 contains a second group of television channels. Each of these television channels may be scrambled such that unauthorized persons are prevented from accessing the television channels.

Transponder stream 280-1 represents a transponder stream signal between satellite 230-1 and satellite antenna 240. Transponder stream 280-2 represents a transponder stream signal between satellite 230-2 and satellite antenna 240. Each of transponder streams 280 may contain one or more different television channels, which may be at least partially scrambled. For example, transponder stream 280-1 may be a first transponder stream containing a first group of television channels, while transponder stream 280-2 may be a second transponder stream containing a different group of television channels. When a television channel is received as part of a transponder stream and is decoded and output to television 130 (rather than first storing the television channel to a storage medium as part of DVR functionality, then later outputting the television channel from the storage medium), the television channel may be considered to be viewed "live."

FIG. 2 illustrates transponder stream 280-1 and transponder stream 280-2 being received by satellite antenna 240 and distributed to television receiver 120-2. For a first group of television channels, satellite antenna 240 may receive transponder stream 280-1 and for a second group of channels, transponder stream 280-2 may be received. Television receiver 120-2 may decode the received transponder streams. As such, depending on which television channels are desired to be presented or stored, various transponder streams from various satellites may be received, descrambled, and decoded by television receiver 120-2.

Network 140 may serve as a secondary communication channel between television service provider system 110 and television receiver 120-2. However, in many instances, television receiver 120-2 may be disconnected from network 140 (for reasons such as because television receiver 120-2 is not configured to connect to network 140 or a subscriber does not desire or cannot connect to network 140). Via such a secondary communication channel, bidirectional exchange of data may occur. As such, data may be transmitted to television service provider system 110 from television receiver 120-2 via network 140. This secondary communication can be used for communication (text, video, audio) with other users within a group. A wager placed through television receiver 120-2 may be transmitted via network 140 to sportsbook system 150 via television service provider system 110. Network 140 may be the Internet. While audio and video services may be provided to television receiver 120-2 via satellites 230, feedback from television receiver 120-2 to television service provider system 110 may be transmitted via network 140. In some embodiments, sports gaming data to populate the sports gaming application may be sent via satellites 230 such that a television viewer can use the sports gaming application even if no internet application is available to television receiver 120-2.

Television service provider system 110, which can include one or more computer server systems, can execute group interaction interface 211. Group interaction interface 211 can allow for: text, voice, and/or video interactions with other users via television service provider system 110, via network 140; presentation of rankings with other users based on wagers; and side bets directly with other users.

Figure 3:
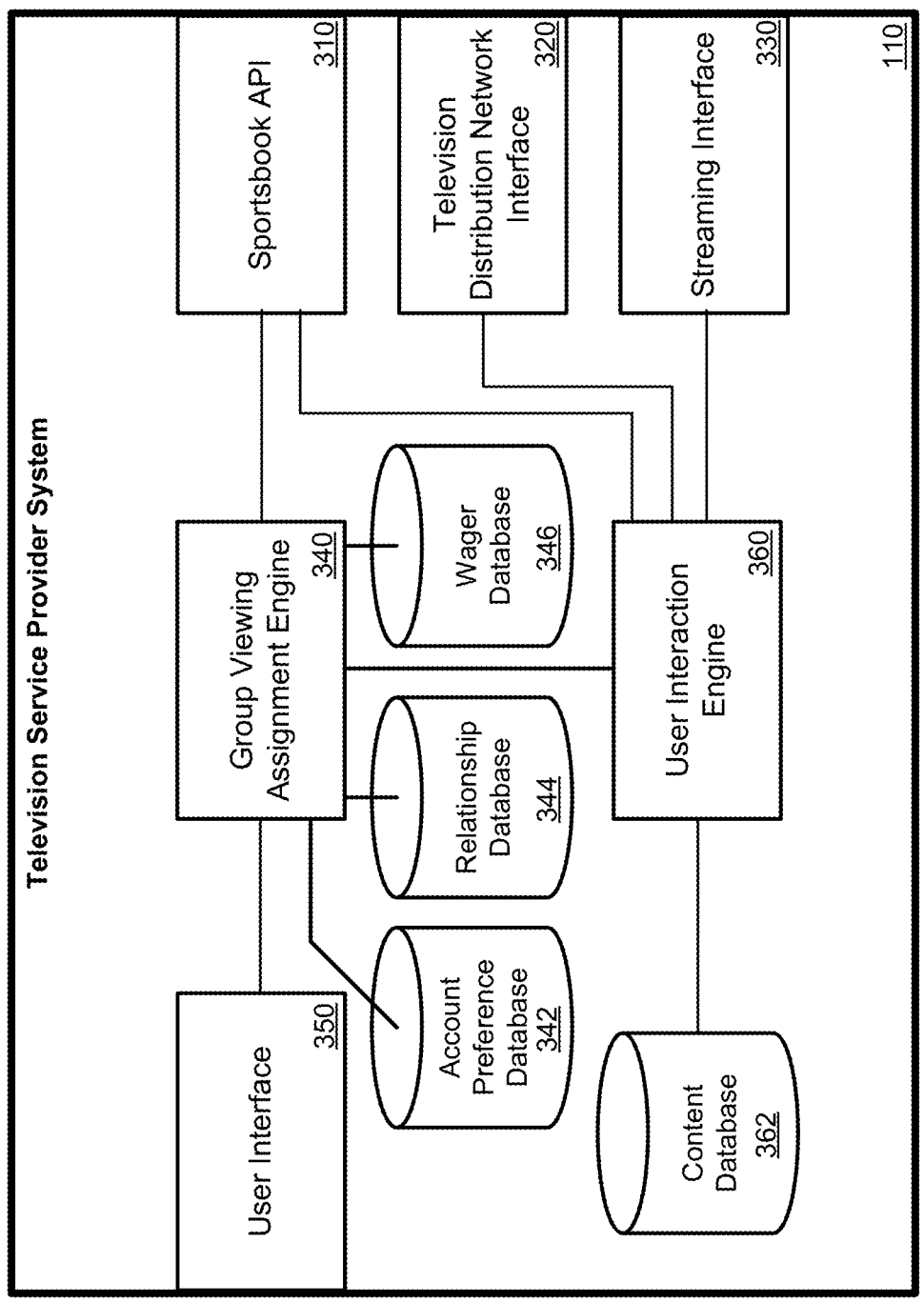
FIG. 3 illustrates an embodiment of a television service provider system.

FIG. 3 illustrates an embodiment of a television service provider system. Television service provider system 110 can include: sportsbook application programming interface (API) 310; television distribution network interface 320; streaming interface 330; group viewing assignment engine 340; account preference database 342; relationship database 344; wager database 346; user interface 350; user interaction database 360; and content database 362.

Television service provider system 110 may include one or more special-purpose or general-purpose processors to perform the functions of its various components, such as group viewing assignment engine 340 and interfaces 310, 320, and 330. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Non-transitory processor readable mediums may be used to store databases 342, 344, 346, and 362.

Sportsbook API 310 may be used to communicate with sportsbook system 150. Sportsbook API 310 may exchange data with sportsbook system 150, such as: data indicative of one or more wagers (e.g., amount, team or player on which wager was placed, odds, value of wager, etc.) placed using a user account (e.g., a television service provider user account or a sportsbook provider account that is linked to a television service provider user account); receive or retrieve data indicative of one or more linked contacts or "friends" mapped to the user account; and/or viewing group preferences. For wagers placed through a television- or streaming-based interface, wager information (e.g., amount, team, wager identifier, user account, etc.) may be transmitted via sportsbook API 310 from television service provider system 110 to sportsbook system 150.

Group viewing assignment engine 340 may assign users to viewing groups based on data received from sportsbook API 310 and/or data from account preference database 342, relationship database 344, and/or wager database 346. Wager database 346 may store indications of wagers placed through the sportsbook system and received via sportsbook API 310. Wager database 346 can indicate: a team/player/outcome on which the wager was placed; a user account; and a value of the wager. Relationship database 344 may be used to determine user accounts that have been linked together, either by a user of one of the user accounts or users of each user account. In some embodiments, some or all of the linkages may be established via the sportsbook system and may be sent to television service provider system 110 via sportsbook API. Alternatively, linkages may be established through television service provider system 110. A user of a first user account may provide an indication of a friend's user account and indicate that these accounts should be linked. In some embodiments, to complete the linkage, the friend may be required to confirm the linkage. Linkages indicated by sportsbook system 150 may be stored in relationship database 344. A user may be able to access a list of linkages associated with his user account. The user may be permitted to view among his linkages: 1) who has made a wager on an upcoming live event; and/or 2) who has indicated interest in joining a viewing group.

Account preference database 342 may be used to store preferences associated with individual user accounts. A user may specify whether he desires to participate in group viewing events only with linked accounts or also with unlinked accounts. Viewing groups with linked accounts may result in the user only participating in group events with people with whom he has a previous relationship. Participating in group viewing events with unlinked accounts may result in the user participating in a group viewing event with other persons who have placed a wager but are otherwise unknown to the user. Grouping with such other persons may be performed based on other parameters, such as: wagering interest (which team has each user bet on); amount of wager; number of wagers; geographic location; timezone; etc.

A user may be permitted to provide various preferences for group viewing via user interface 350. User interface 350 may receive information from television receivers, computerized streaming devices, and/or mobile devices. In account preference database 342, the user may provide information indicating whether he prefers to be grouped with other users who have wagered on a same side or opposite side as the user. For example, the user may consider it more enjoyable when other users are on the same side of the wager as he is. Alternatively, the user may consider it more enjoyable for viewing the event when at least some other users participating in a group viewing event are on the opposite side of the wager as he is.

Account preference database 342 may further indicate whether a user desires to participate in a group viewing event for a particular sporting event or a particular wager. For example, when a wager is placed via sportsbook system 150, the user may specify whether he desires to participate in a group viewing event or not. If yes, an indication of such may be sent to sportsbook API 310 and group viewing assignment engine 340 may group the user with other users based on the user's preferences from account preference database 342. Alternatively, the user may provide an indication via user interface 350 to television service provider system 110 that he desires to participate in a group viewing event.

Group viewing assignment engine 340, for a user who desires to participate in a group viewing event, may create a group. The group created may be based on: information from account preference database 342, relationship database 344, and wager database 346. Group viewing assignment engine 340 may use the factors from Table 1 to decide on the grouping. Table 1 may be listed in descending order of importance. Thus, the higher a parameter is on Table 1, the greater precedence it can take for creating groups over lower parameters.

TABLE 1

| Parameter | Value |
| --- | --- |
| Linked Accounts with Active Wager on Live Event Specified? | Yes/No |
| Audience Preference | For/Against User's Wager |
| Wager Type | Moneyline/Odds/Over-Under/ |
| Wager Size | +/−Threshold of User's Wager |

In accordance with Table 1, if a user desires to participate in a group viewing event and has placed a wager, the user may be grouped by group viewing assignment engine 340 with one or more other user accounts that have been linked together, whose users also desire to participate in a group viewing event, and that have placed a wager on the live event via sportsbook system 150. If no other linked user account that also has a wager on the live event is identified, group viewing assignment engine 340 may identify unlinked accounts that match the user's other audience preferences. These other accounts may be required to have placed a wager on the live event and have also indicated a desire to participate in a group viewing event. If the user prefers to view the live event with an audience having the same rooting/betting interest, the entirety of the group may be required to have wagered on a same side of the live event (e.g., for a same team, the same side of an over/under bet, for a same player, for a same prop outcome, etc.). If the user prefers to view the live even with an audience having an opposite rooting/betting interest, at least some of the group (e.g., greater than 40%) may have wagered on an opposite side of the live event (e.g., the other team, opposite sides of an over/under bet, for players on opposite teams, the opposite side of a same prop bet, etc.).

In addition to audience preference, wager size and/or wager type may be taken into account in creating a group-by-group viewing assignment engine 340. For example, a wager size threshold of $20 may be in place. This wager size threshold may result in a group being created that involves user accounts that have placed a wager that is within a $20 range of value. In some embodiments, a preference may be given for grouping wagers of the same type. For instance, a user that has placed a moneyline wager may be grouped with other users who have also placed moneyline wagers. In some embodiments, a user may define a preference for whether wager size or wager type is the more important factor for grouping. In some embodiments, wager type may be used to define an eligible group of users prior to considering wager size.

Group viewing assignment engine 340 may provide an indication of a group that is to participate in a group viewing event to user interaction engine 360. Based on information retrieved from content database 362 and/or from content server system 160, at the start of the live event or some predefined amount of time before the live event, user interaction engine 360 may initiate the group viewing event. Once the group viewing event has been initiated, each user within the group may be able to: view wagers placed on the live event by each other user in the group; view a ranking within the group based on wagers placed on the live event; and communicate via text, video, and/or audio with other users in the group.

User interaction engine 360 may route communications between the users and present the wagering interface using television distribution network interface 320, which may enable communication with television receivers via the internet and/or a television service provider network, and streaming interface 330, which may enable communication with streaming devices and computerized devices. Video/audio/text from a particular user in a group, received via interfaces 320 or 330, may be routed to other users within the group via interfaces 320 and 330.

While the live event is ongoing, additional wagers on the live event may be placed by one or more users within the group via sportsbook system 150. An indication of the one or more new wagers may be received by sportsbook API 310. User interaction engine 360 may use such data to update a ranking or indication of wagers for users within the group to indicate the new wager. Further, user interaction engine 360 may occasionally or periodically update the ranking of users within the group based on wagers pertaining to the live event. A user's ranking may be increased based on a wager being "in the money" and decreased based on a wager being "out of the money." Therefore, the total ranking may be based on an amount of money the user stands to win or lose based on the live event as it presently stands.

User interaction engine 360 may permit sidebets to be placed. A sidebet may not involve sportsbook system 150. A sidebet may be placed directly between two users via user interface 350 within a group and may be reflected in the ranking provided to members of the group. While the bet itself may be monitored by user interaction engine 360 for the purposes of ranking users with the group such as based on statistics from or the outcome of the live event, funding of the bet may be performed directly between the two users participating in the sidebet. Alternatively, in some embodiments, sidebets may be placed through sportsbook system 150 similar to wagers, and indications of such sidebets may be received by user interaction engine 360 via sportsbook API 310.

Figure 4:
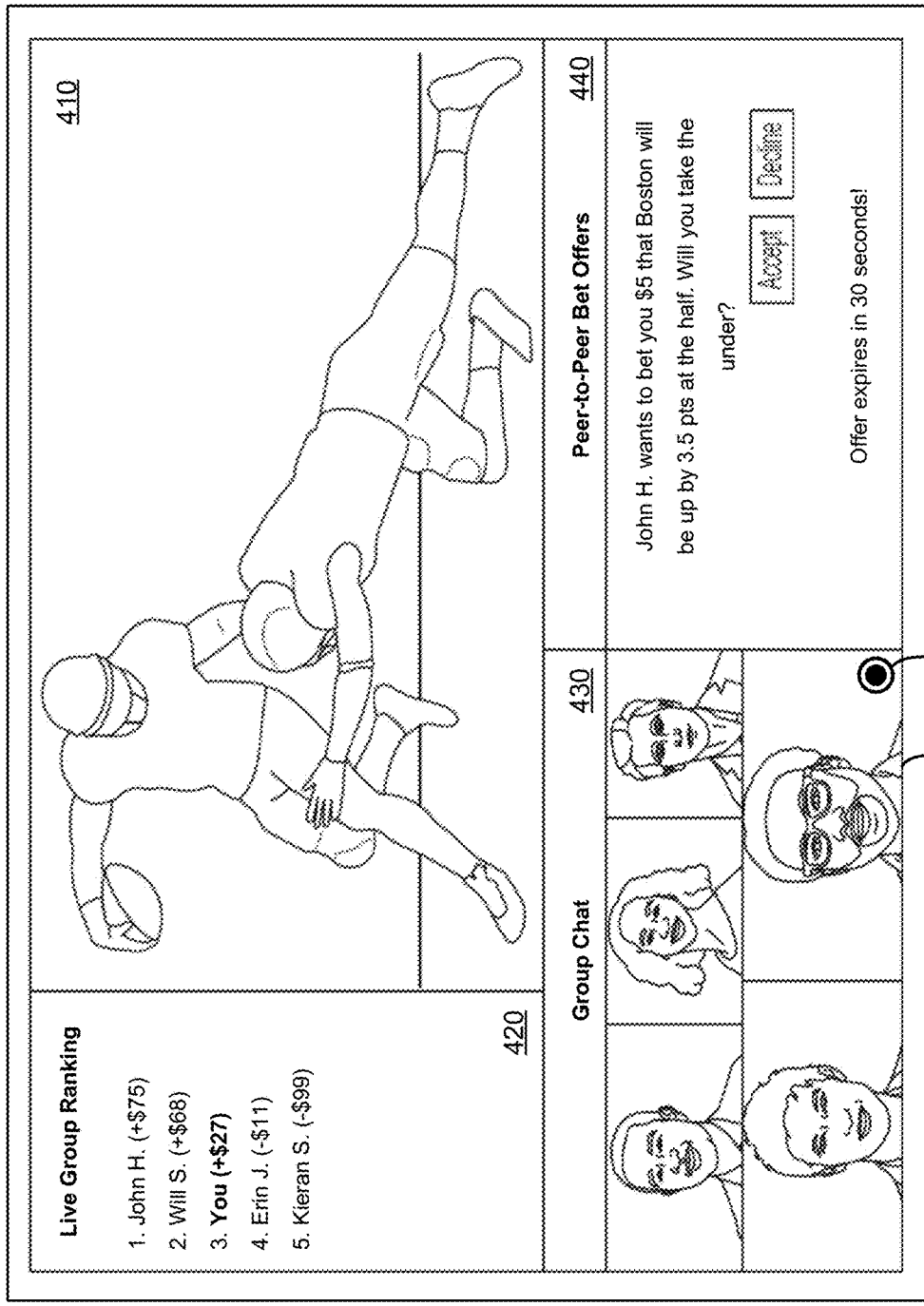
FIG. 4 illustrates an embodiment of a group live content event interaction interface.
Figure 5:
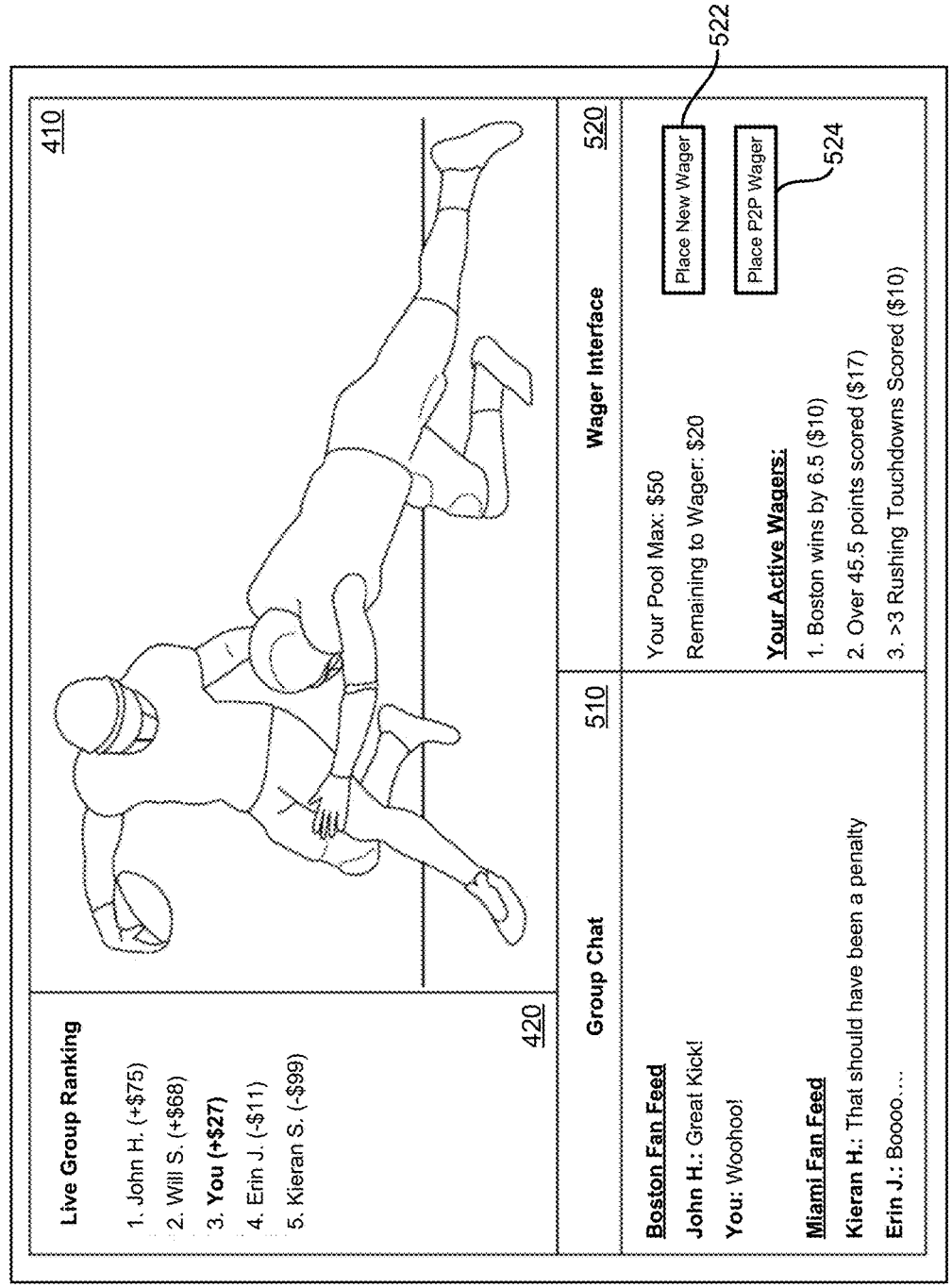
FIG. 5 illustrates another embodiment of a group live content event interaction interface.

FIGS. 4 and 5 illustrate examples of interfaces that may be used by a user to interact with a group and manage wagers. The interfaces of FIGS. 4 and 5 are examples—in other embodiments, components of the interface may be arranged or presented differently. FIG. 4 illustrates an embodiment of a group live content event interaction interface 400 ("interface 400"). Interface 400 may be output for presentation by a smart television, television receiver (e.g., set top box), streaming media device, computerized device (e.g., or other device, such as a tablet computer executing a streaming media application).

Region 410 may present a live stream of the event which the group is viewing. In the example of interface 400, a live (American) football game is presented. In region 420, a ranking of members of the group based on whether their placed wagers on the live viewing event is presented. The ranking may be based on wagers on the live event that have already been completed (e.g., a wager on whether the first play of the game was a run or pass) and/or a prediction on whether a particular wager will pay out (e.g., a wager on the over/under of the entire game). As the wagers are completed and/or the predictions are updated, the live group ranking may be updated.

In region 430, a group video chat can be present. Each member of the group may be able to speak and be heard by each other member of the group. In the illustrated example, user 431 is speaking, as denoted by audio icon 432.

In region 440, peer-to-peer (P2P) bet offers are presented. In this group, user "John H." has made the user a P2P bet offer on the score of the game at the half. The user is allotted a predefined amount of time to accept or decline. If the predefined amount of time elapses, the P2P bet may be automatically withdrawn. The value of the P2P bet may or may not be included in the live group ranking of region 420. Settlement of P2P bets may occur outside of an electronic sportsbook system or through it.

FIG. 5 illustrates an embodiment of a group live content event interaction interface ("interface 500"). Regions 410 and 420 may function as detailed in relation to interface 400 of FIG. 4. Region 510 may allow for text-based chatting among members of the group. In this embodiment, members of the group are divided up based on which team they have wagered on to win. For example, Kieran H. and Erin J. have wagered on Miami to win.

In region 520, the user's wagers are presented. This group has created a limit of $50 as a total value per user for wagering on the live event presented in region 410. The present user still has $30 of his total value available to wager. By limiting the total amount a user can wager, the live group ranking may be considered fairer. The user has already placed three wagers, which are listed within region 520. The user can select element 522 to place another wager or element 524 to try placing a peer-to-peer wager with another member of the group.

Figure 6:
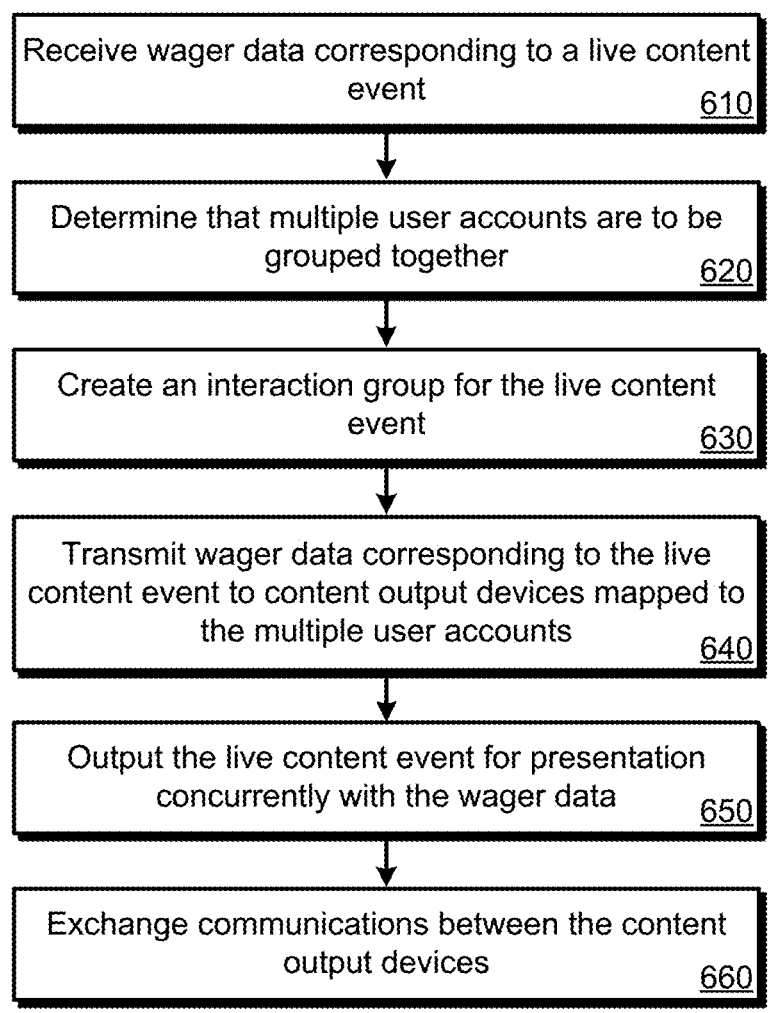
FIG. 6 illustrates an embodiment of a method for group interactions for a live content event.

Various methods may be performed using the systems and interfaces detailed in relation to FIGS. 1-5. FIG. 6 illustrates an embodiment of a method 600 for group interactions for a live content event. Method 600 may be performed using a system of FIGS. 1-3 or an alternate embodiment of such a system. Each block of method 600 may be performed by television service provider system 110. At block 610, wager data may be received by television service provider system 110 that is indicative of a wager being placed with sportsbook system 150 that corresponds to a particular television service provider system user account. The wager data may indicate: the live event on which the wager was placed; the amount of the wager; the outcome the wager is based on (e.g., a particular team to cover the spread); the type of wager; and/or whether the user desires to participate in a group viewing event. In some embodiments, the user may separately specify whether or not the user desires to participate in a group viewing event, such as via input provided directly to system 110.

At block 620, multiple user accounts may be grouped together for a viewing event by television service provider system 110. A prerequisite for a group viewing event may be that each user account has placed a wager via sportsbook system 150 on the live viewing event; that the live viewing event is available for viewing through television service provider system 10; and that each user account has access to the viewing event (e.g., via a subscription with television service provider system 110). Grouping may be performed as detailed in relation to group viewing assignment engine 340. A grouping may be based on whether a group of user accounts that have been previously linked is to be placed in a group or if a grouping is to be created out of a group of user accounts with no prior relationship.

At group 630, the group may be created and initiated for the live content event. For example, the group may be initiated a predefined amount of time prior to the live event (and may conclude a predefined period of time after the conclusion of the live event). At block 640, wager data may be shared by television service provider system 110 for the user accounts within the group. An interface may be presented, concurrently with the live event, that allows each user to view wagers placed through sportsbook system 150 on the live event (wagers on other events may be excluded) by other users within the group. The interface may rank each user within the group based on the current status of each user's wagers on the live event. For example, the ranking may be based on if the live event ended immediately, which wagers would be winning wagers and which would be losing wagers. The user in the group that stands to presently win the most money would be ranked first, the user in the group that stands to win the least money would be ranked last, and so on. This wager data may be transmitted to each content viewing device of the group, along with the live content event at block 650. The wager data can be periodically updated based on the live event and, possibly, any new wagers placed by members of the group. In some embodiments, each member of the group may only be permitted up to a certain number of in-game wagers. For instance, a group may be limited such that each user can only place $100 of wagers once an event has begun.

In some embodiments, rather than users placing one or more wagers on a live event before being placed in a group, the user may place wagers after entering the group. In such an arrangement, each user within a group may be permitted a pool of points or money which they can wager during the live event. Each user may be provided with the same amount of points or money, thus the user that wins the largest amount during the live event will have demonstrated his wagering skills live to others in the group.

At block 660, while the live content event is ongoing, users within a defined group may be able to communicate with each other. This communication may be performed via television service provider system 110 via text, voice, and/or video. Such communications may be presented to users within the group such as via the interfaces of FIGS. 4 and 5 or some other form of interface.

Figure 7:
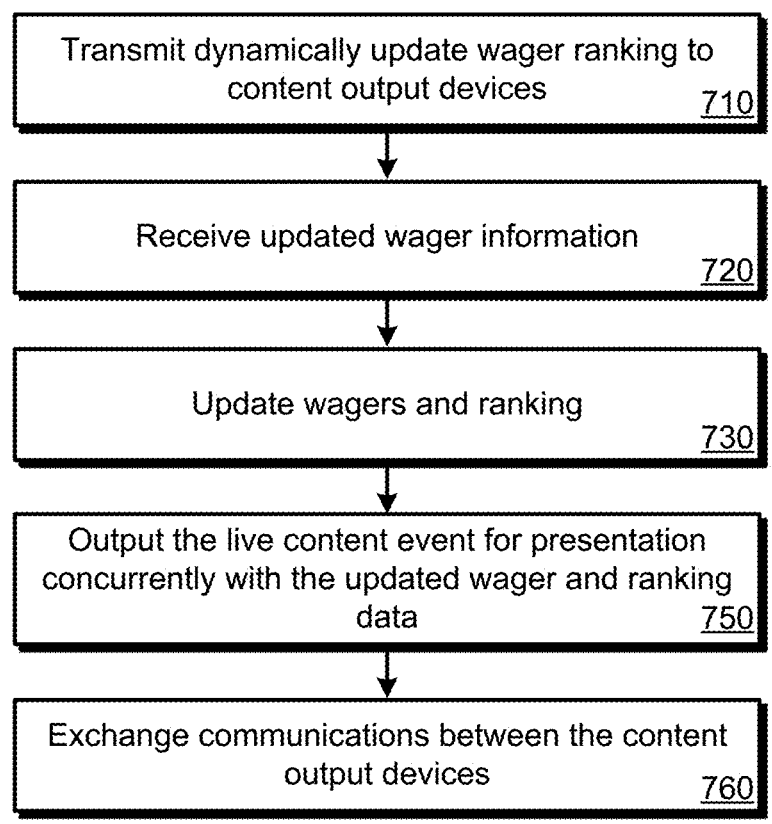
FIG. 7 illustrates another embodiment of a method for group interactions for a live content event.

FIG. 7 illustrates another embodiment of a method for group interactions for a live content event. Method 700 may be performed using a system of FIGS. 1-3 or an alternate embodiment of such a system. Each block of method 700 may be performed by television service provider system 110. Method 700 may be performed as part of method 600 in response to additional wagers or the current state of the live event.

At block 710, as the live event progresses and changes, a ranking based on wagers placed with sportsbook system 150 is updated and transmitted to the content viewing devices of a group of users. In some embodiments, whether or not a wager is winning ("in the money") or losing ("out of the money") is determined by sportsbook system 150 and indicated to television service provider system 110 via a sportsbook API. In other embodiments, based on the parameters of the wager previously provided to television service provider system 110, television service provider system 110 determines if the wager is currently winning or losing.

At block 720, updated wager information may be received by television service provider system 110 from sportsbook system 150. The updated wager information may indicate a new wager placed by a user of a group. In response to the new wager, the wagers presented to the users of the group and the ranking of users within the group are updated at block 730. In some embodiments, a sidebet can be placed directly between users. In a sidebet, a first user directly bets against a second user for an agreed-upon amount with agreed-upon odds. Such a sidebet may be placed directly via television service provider system 110 or through sportsbook system 150. If placed directly via television service provider system 110, settlement may occur between the users separate from sportsbook system 150 and television service provider system 110.

At block 750, the live content event may be output for presentation on each content viewing device of the users of the group along with the updated wager and ranking information. At block 760, while the live content event is ongoing, users within a defined group may be able to communicate with each other. This communication may be performed via television service provider system 110 via text, voice, and/or video. Such communications may be presented to users within the group such as via the interfaces of FIGS. 4 and 5 or some other form of interface.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for group-based content viewing, the method comprising:
   receiving, by a television service provider system, wager data corresponding to a live content event for a plurality of user accounts, wherein each user account of the plurality of user accounts is linked to at least one wager on the live content event;
   determining, by the television service provider system, the plurality of user accounts are grouped based on:
   (1) determining each user account of the plurality of user accounts is linked to at least one wager on the live content event; and
   (2) determining each user account of the plurality of user accounts has access to the live content event via a subscription through the television service provider system;
   creating, by the television service provider system, a viewing group for the live content event for only the plurality of user accounts based on determining the plurality of user accounts are grouped;
   transmitting, by the television service provider system, to a plurality of content output devices, the wager data corresponding to the plurality of user accounts within the viewing group, wherein each of the plurality of content output devices is mapped to a particular user account of the plurality of user accounts;
   outputting, by each content output device of the plurality of content output devices, the live content event for presentation concurrently with presentation of a ranking of the plurality of user accounts based on the at least one wager on the live content event linked to each user account of the plurality of user accounts, wherein only wagers corresponding to the live content event are used for the ranking of the plurality of user accounts;
   receiving, by a content output device of the plurality of content output devices, a peer-to-peer wager offer from a user account of the plurality of user accounts, wherein the peer-to-peer wager offer is mapped to a predefined amount of time for a user of the content output device to accept or decline; and
   outputting, by the content output device, the peer-to-peer wager offer indicating the user account for presentation concurrently with the live content event and the ranking of the plurality of user accounts by the content output device.

2. The method for group-based content viewing of claim 1, wherein determining the plurality of user accounts are linked is partially based on receiving, by the television service provider system, a request to link a first user account of the plurality of user accounts to a second user account of the plurality of user accounts.

3. The method for group-based content viewing of claim 1, further comprising:
   receiving, by the television service provider system, text from a content output device of the plurality of content output devices; and
   transmitting, by the television service provider system, the text for presentation to other content output devices of the plurality of content output devices.

4. The method for group-based content viewing of claim 1, further comprising:
   transmitting, by the television service provider system to the plurality of content output devices, a ranking of each user account of the plurality of user accounts based on the at least one wager on the live content event placed by each user account; and
   outputting, by each content output device of the plurality of content output devices, for presentation the ranking of each user account of the plurality of user accounts based on the at least one wager on the live content event placed by each user account.

5. The method for group-based content viewing of claim 4, further comprising:
   during the live content event, adjusting, by the television service provider system, the ranking based on one or more in-event occurrences of the live content event.

6. The method for group-based content viewing of claim 1, wherein determining the plurality of user accounts are linked is based on a team selected by each user account of the plurality of user accounts for the at least one wager.

7. The method for group-based content viewing of claim 1, further comprising:
   during the live content event, receiving, by the television service provider system, an indication of an additional wager placed by a user account of the plurality of user accounts on the live content event; and
   outputting, by each content output device of the plurality of content output devices, for presentation the additional wager.

8. The method for group-based content viewing of claim 1, further comprising:
   during the live content event, receiving, by the television service provider system, an indication of a wager between only a first user account of the plurality of user accounts and a second user account of the plurality of user accounts, wherein the first user account and the second user account are on opposite sides of the wager.

9. The method for group-based content viewing of claim 1, further comprising:
concurrently with outputting the live content event, outputting, by each content output device of the plurality of content output devices, a video chat interface for video and audio communication between the plurality of content output devices.

10. The method for group-based content viewing of claim 1, further comprising:
concurrently with outputting the live content event, outputting, by each content output device of the plurality of content output devices, a text-based group chat interface for communication between the plurality of content output devices.

11. The method for group-based content viewing of claim 1, wherein determining the plurality of user accounts are linked is based on each user account of the plurality of user accounts wagering an amount within a predefined value range.

12. A group-based content viewing television system, comprising:
a plurality of content output devices; and
a television service provider system that transmits televised content to the plurality of content output devices and communicates with an electronic sportsbook provider system, wherein the television service provider system is configured to:
receive wager data corresponding to a live content event for a plurality of user accounts, wherein each user account of the plurality of user accounts is linked to at least one wager on the live content event;
determine to group the plurality of user accounts based on:
(1) determining each user account of the plurality of user accounts is linked to at least one wager on the live content event; and
(2) determining each user account of the plurality of user accounts has access to the live content event via a subscription through the television service provider system;
create a viewing group for the live content event for only the plurality of user accounts based on determining the plurality of user accounts to group; and
transmit, to the plurality of content output devices, the wager data corresponding to the plurality of user accounts, wherein each of the plurality of content output devices is mapped to a particular user account of the plurality of user accounts, wherein
each content output device of the plurality of content output devices output the live content event for presentation concurrently with presentation of a ranking of the plurality of user accounts based on the at least one wager on the live content event linked to each user account of the plurality of user accounts; and
only wagers corresponding to the live content event are used for the ranking of the plurality of user accounts.

13. The group-based content viewing television system of claim 12, wherein the television service provider system is further configured to determine the plurality of user accounts are linked based on receiving a request to link a first user account of the plurality of user accounts to a second user account of the plurality of user accounts.

14. The group-based content viewing television system of claim 12, wherein the television service provider system is further configured to:
receive text from a content output device of the plurality of content output devices; and
transmit the text for presentation to other content output devices of the plurality of content output devices.

15. The group-based content viewing television system of claim 12, wherein the television service provider system is further configured to:
transmit, to the plurality of content output devices, a ranking of each user account of the plurality of user accounts based on the at least one wager on the live content event placed by each user account; and each content output device of the plurality of content output devices is further configured to:
output for presentation the ranking of each user account of the plurality of user accounts based on the at least one wager on the live content event placed by each user account.

16. The group-based content viewing television system of claim 15, wherein the television service provider system is further configured to adjust the ranking based on one or more in-event occurrences of the live content event during the live content event.

17. The group-based content viewing television system of claim 12, wherein the television service provider system is further configured to determine the plurality of user accounts are linked is based on a team selected by each user account of the plurality of user accounts for the at least one wager.

18. The group-based content viewing television system of claim 12, wherein the television service provider system is further configured to:
receive an indication of an additional wager placed by a user account of the plurality of user accounts on the live content event during the live content event, and wherein each content output device of the plurality of content output devices outputs for presentation the additional wager.

19. The group-based content viewing television system of claim 12, wherein each content output device of the plurality of content output devices is selected from the group consisting of: a television receiver; a computerized device that executes a first streaming application; a smart television; and a streaming device that executes a second streaming application.

* * * * *